United States Patent
Chapman et al.

(10) Patent No.: US 8,966,510 B2
(45) Date of Patent: Feb. 24, 2015

(54) KERNEL EXECUTION FOR HYBRID SYSTEMS

(71) Applicant: International Business Machines Corporation, Armonk, NY (US)

(72) Inventors: D. Gary Chapman, Clinton Corners, NY (US); Rajaram B. Krishnamurthy, Wappingers Falls, NY (US); Deborah A. Odell, Staatsburg, NY (US); Benjamin P. Segal, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 13/758,654

(22) Filed: Feb. 4, 2013

(65) Prior Publication Data

US 2014/0223151 A1    Aug. 7, 2014

(51) Int. Cl.
*G06F 3/00* (2006.01)
*G06F 9/44* (2006.01)
*G06F 9/46* (2006.01)
*G06F 13/00* (2006.01)
*G06F 9/30* (2006.01)
*G06F 9/38* (2006.01)

(52) U.S. Cl.
CPC .......... *G06F 9/30003* (2013.01); *G06F 9/3861* (2013.01)
USPC .......................................... 719/330; 719/319

(58) Field of Classification Search
None
See application file for complete search history.

(56) References Cited

U.S. PATENT DOCUMENTS

| | | | |
|---|---|---|---|
| 2011/0022817 A1 | 1/2011 | Gaster et al. | |
| 2011/0035736 A1* | 2/2011 | Stefansson et al. | 717/149 |
| 2011/0202745 A1 | 8/2011 | Bordwekar et al. | |
| 2012/0075316 A1* | 3/2012 | Kim et al. | 345/522 |
| 2013/0222399 A1* | 8/2013 | Bourd et al. | 345/506 |
| 2013/0247034 A1* | 9/2013 | Messerli | 718/1 |
| 2014/0026111 A1* | 1/2014 | Stitt et al. | 717/101 |

OTHER PUBLICATIONS

Badishi, Kernel writing to read-only memory, May 1, 2012, 4 pages.*
Khronous group, The OpenCL Specification, Version 1.0, Oct. 6, 2009.*

* cited by examiner

*Primary Examiner* — Diem Cao
(74) *Attorney, Agent, or Firm* — Cantor Colburn LLP; Steven Chiu

(57) ABSTRACT

A method for executing kernels in a hybrid system includes running a program on a host computer and identifying in an instruction stream of the program a first instruction including a function of a target classification. The method includes generating a first kernel including the function and transmitting the first kernel to a client system to execute the first kernel based on identifying the first instruction as being of the target classification. The method also includes determining whether to store results of executing the first kernel in a read-only buffer of the client system based on determining whether a subsequent instruction of the target classification relies upon results of the first instruction.

20 Claims, 3 Drawing Sheets

KERNEL EXECUTION FOR HYBRID SYSTEMS

BACKGROUND

The present disclosure relates generally to distributed function execution, and more specifically, to distributed function execution for hybrid systems using OpenCL.

Open Computing Language (OpenCL) is a framework for writing programs that execute across heterogeneous platforms consisting of CPUs, Graphics Processing Units (GPUs), and other processors. OpenCL includes a language for writing kernels, which are functions that execute on OpenCL devices, and application programming interfaces (APIs) that are used to define and then control the platforms. OpenCL provides parallel computing using task-based and data-based parallelism.

Since OpenCL was designed to be used with a non-distributed system, OpenCL is not designed to optimize data transmission between the various processors and buffers used by the devices in the system. In addition, some function calls, such as function calls to scientific function libraries requiring parallel processing of algebraic functions, may not be supported by a computing system, resulting in an error when scientific functions are encountered in an application.

BRIEF SUMMARY

According to one embodiment of the present disclosure, a computer-implemented method for executing kernels in a hybrid system includes running a program on a host computer and identifying in an instruction stream of the program a first instruction including a function of a target classification. The method includes generating a kernel including the function and transmitting the kernel to a client system to execute the kernel. The method also includes determining whether to push a read-only buffer to the client system to store results of executing the kernel based on determining whether a subsequent instruction of the target classification relies upon results of the first instruction.

Accordingly to another embodiment of the present disclosure, a computer program product for executing a kernel in a hybrid system includes a tangible storage medium readable by a processing circuit and storing instructions for execution by the processing circuit for performing a method. The method includes running a program on a host computer, identifying in an instruction stream of the program a first instruction including a function of a target classification and generating a kernel including the function. The method further includes transmitting the kernel to a client system to execute the kernel and determining whether to push a read-only buffer to the client system based on determining whether a subsequent instruction of the target classification relies upon results of the first instruction.

Accordingly to yet another embodiment of the present disclosure, a client computer system for executing a function kernel includes memory having stored therein a computer program and a processor. The processor is configured to receive from a host computer a buffer having stored therein a kernel corresponding to an instruction of programming code, to execute the kernel, to store results of executing the kernel in the buffer, and to determine whether to transmit the results of executing the kernel to the host computer based on determining whether the buffer is a read-only buffer.

Additional features and advantages are realized through the techniques of the present disclosure. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Computing systems running OpenCL may run inefficiently or encounter errors when attempting to call non-OpenCL functions, floating point functions and complex functions, such as scientific functions from scientific function libraries. Embodiments of the present disclosure relate to executing kernels of complex functions, such as scientific functions, in a distributed system.

Figure 1:
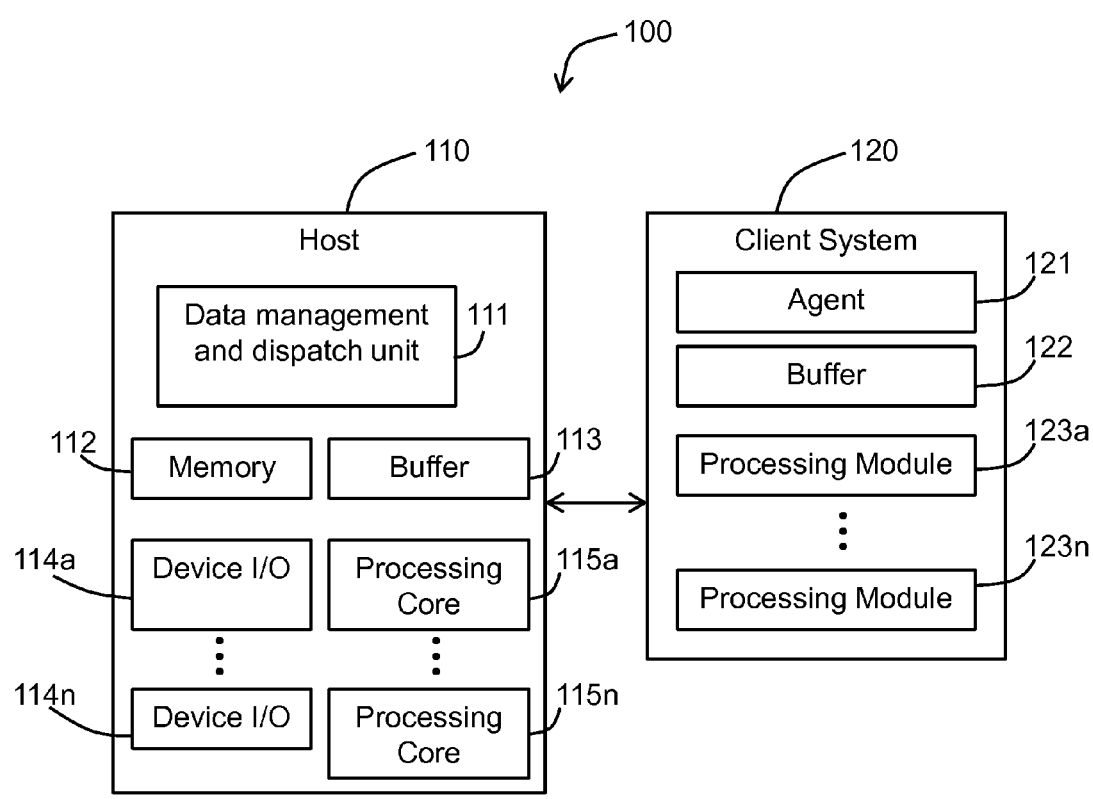
FIG. 1 is a block diagram of a computer system according to one embodiment of the present disclosure.

FIG. 1 illustrates a block diagram of a computing system 100 according to an embodiment of the present disclosure. The computing system 100 includes a host 110 and a client system 120. In one embodiment, the host 110 is a mainframe computer, such as a mainframe server. In one embodiment, the host 110 is an SYSTEM z mainframe computer by INTERNATIONAL BUSINESS MACHINES, INC. (IBM). The client system 120 may be a distributed system, or a system having multiple processing cores. In one embodiment, the client system 120 includes one or more BLADE servers by IBM. Each BLADE server may include processor types SYSTEM p and SYSTEM x different from the mainframe computer processor.

The computing system 100 may be referred to as a hybrid system 100, since some operations are executed in a non-distributed manner by a host 110 and other operations are executed in a distributed manner by a plurality of processing modules 123*a* to 123*n* of a client system 120. Additionally, each of the processing modules 123*a* to 123*n* may have different processor types than the host 110. In one embodiment, the host 110 has a SYSTEM z operating system (e.g., zOS or zLinux) while the client system 120 has any other type of operating system (e.g., AIX or Linux). In one embodiment, host 110 is configured to transmit Open CL programming instructions to the client system 120 for execution on the client system 120. The client system 120 may be configured to execute both OpenCL kernels as well as non-OpenCL programming code, such as C programming code.

The host 110 includes a data management and dispatch unit 111, memory 112, a buffer 113, one or more device I/O modules 114*a* to 114*n* and one or more processing cores 115*a* to 115*n*. The data management and dispatch unit 111 may include processing circuitry including fetching units and a pre-processor as well as memory including data caches and buffers. The memory 112 may include volatile and non-volatile memory, read-only memory (ROM), hard-disks, hard drives, optical disks, random access memory (RAM), flash memory and any other type of memory device for storing data. The buffer 113 may include any type of data buffer, such as a RAM data buffer.

The device I/O modules 114a to 114n may include data ports and corresponding data processing circuitry, such as data converters, transmission method converters (e.g., electrical to optical) and any other circuitry to enable the host 110 to transmit data to, and receive data from, one or more external devices. The processing cores 115a to 115n may include processors for simultaneously executing instructions.

In one embodiment, the host 110, including the data management and dispatch unit 111 and processing cores 115a to 115n, are configured to run a first type of programming code, or a first runtime environment, and the client system 120 is configured to run a second type of programming code, or a second runtime environment. For example, in one embodiment, the host 110 is configured to run non-OpenCL programming code on the processing cores 115a to 115n of the host computer 110. In such an embodiment, when an OpenCL instruction is detected by the data management and dispatch unit, the data management and dispatch unit may generate a kernel, store the kernel in the buffer 113 and transmit the kernel to the client system 120 for executing the OpenCL programming code.

The client system 120 includes an agent 121, buffer 122 and one or more processing modules 123a to 123n. The agent 121 may be a software code executed by a processor to receive instructions from the host 110 and control the client system 120 to execute data from the host on the one or more processing modules 123a to 123n. The buffer 122 may store data received from the host 110 and waiting to be transmitted to the host 110. In one embodiment, the buffer 122 is a group of locations in memory designated by an application or operating system as being allotted to a particular purpose. For example, the host may generate a buffer 113 to store a kernel. The buffer may include descriptor data, such as contents description, size, and other information describing the buffer. The host 110 may transfer the buffer 113, or the kernel and descriptor information, to the client system 120 which generates the corresponding buffer 122, or allocates memory of the size indicated by the descriptor and having the contents indicated by the descriptor.

In one embodiment, the processing modules 123a to 123n are separate computing cores, such as separate computers or separate servers. In one embodiment, the client system 120 is a distributed system. For example, the agent 121 and buffer 122 may be located in a central server and the processing modules 123a to 123n may each be separate computers or servers connected to the central server via a communications network. In an embodiment in which the host 110 is a SYSTEM z processor computer by IBM, the separate processing modules 123a to 123n may be BLADE servers.

In operation, the data management and dispatch unit 111 of the host 110 fetches, executes and manages one or more streams of instructions of one or more applications. The data management and dispatch unit 111 recognizes instructions or functions in the one or more streams of instructions to be sent to the client system 120 for execution. The instructions or functions that are identified to be sent to the client system 120 may correspond to one or more predetermined target classifications, such as OpenCL functions and instructions that include an "enqueue native kernel" instruction. The data management and dispatch unit 111 creates a kernel corresponding to the portions of the stream of instruction to be sent to the client system 120 and stores the kernel, input parameters for the function and descriptor data in the buffer 113. In one embodiment, the buffer 113 includes a set up buffers. The host 110 transmits the buffer 113, including the kernel, input parameters and descriptor data, to the client system 120. The agent 121 of the client system 120 communicates with the data management and dispatch unit 111 of the host to receive instructions for receiving the buffer 113, generating a corresponding buffer 122 and executing the kernel. The buffer 122 may include a set of buffers, including at least one output results buffer designated to store output results of an executed kernel.

As discussed above, the data management and dispatch unit 111 may recognize instructions to be sent to the client 120 by detecting an OpenCL instruction or instructions that are not OpenCL but are desired to be executed on the client system 120, as indicated by an "enqueue native kernel" function in the instructions. Examples of functions that may be executed by enqueueing a native kernel in the client system 120 may include floating point operations, scientific functions or calls to a scientific library, such as a Basic Linear Algebra Subroutines (BLAS) library or Linear Algebra Package (LAPACK) library that include routines for solving systems of simultaneous linear equations, or other complex functions.

In one embodiment, the agent 121 of the client system 120 executes the scientific functions in a distributed manner, such as by dividing up multiple linear equations to be executed simultaneously by different processing modules 123a to 123n, aggregates the results and stores the results in the buffer 122. In one embodiment, the contents of the buffer 122 are pushed to a corresponding buffer 113 of the host 110, and the results are then accessed by an execution unit or processor of the host 110 to execute an application.

In one embodiment, the data management and dispatch unit 111 determines whether one instruction uses results from another instruction, and if both instructions are to be executed on the client system 120, the data management and dispatch unit 111 marks the kernel and the result buffer of the first-executed instruction to be kept on the client system 120 until the second instruction is executed. Then, the results of the second instruction may be sent to the host 110 without sending the results of the first instruction to the host 110. Accordingly, latency may be reduced and processing bandwidth of the host 110 is preserved.

In particular, when the data management and dispatch unit 111 determines that one instruction that is to be sent to the client system 120 depends on results from another, the data management and dispatch unit 111 may store a kernel corresponding to the first instruction in a buffer, may mark an additional result buffer corresponding to the aforementioned kernel with a read-only flag, and may also provide exception data, such as an exception or violation flag indicating that, although the buffer 113 is a read-only buffer, the buffer may be written to with the results of the first kernel. The host 110 transmits the buffer 113 to the client system 120, and the agent 121 generates an output buffer 122 corresponding to the buffer 113.

The agent 121 reads the descriptor data of the buffer 122 and may receive instructions from the data management and dispatch unit 111 to execute the first kernel. The agent 121 may divide the kernel into segments and execute different segments on different processing modules 123a to 123n. When the agent 121 recognizes the kernel as corresponding to an "enqueue native kernel" function, the agent 121 may control the processing modules 123a to 123n to execute the kernel in a native programming code instead of the default programming code. For example, in one embodiment the client system 120 is configured to execute instructions in an OpenCL runtime execution environment, but the kernel associated with the "enqueue native kernel" instruction may be in another code, such as C programming code, FORTRAN, or any other native code. Accordingly, the agent 121 determines the native code and controls the processing modules 123a to 123n to execute the kernel in the native code.

Upon executing the kernel, the agent 121 may then determine whether the buffer 122 is read-only, and if so, the agent 121 may determine whether an exception flag is set. If the exception flag is set, then the agent 121 accumulates the results of the executed kernel and writes the results to the buffer 122, despite the buffer being designated as "read-only." The agent 121 may form another buffer corresponding to the second kernel, may control the processing modules 123a to 123n to execute the second kernel, and may combine the results of the first and second kernels in the second buffer. Alternatively, the results of the first kernel may be used as input parameters of the second kernel. The agent 121 may determine whether the second buffer is designated as "read-only" and if not, the agent 121 may push the second buffer to the host 110, which forms a corresponding buffer 113 to store the combined results of the first and second kernels.

In other words, in the OpenCL programming model embodiment, the read-only indicator may be set on the output buffer 122 of the kernel. When an OpenCL kernel executes and issues writes to a read-only buffer, agent 121 would normally flag this as erroneous during compilation or during runtime execution. However, according to an embodiment of the invention, a programmer first places a pragma directive called #read-only-override in the instruction which allows an output buffer marked as read-only to be written to as an output buffer of the kernel even though it violates buffer IO rules (write on read-only buffer). On the client system 120, the agent 121 receives the pragma setting along with the function execution command and sets a bit in a buffer IO runtime violation flag corresponding to the output buffer 122 of the kernel (to remember that the buffer is read-only but is being used as read/write) and provides the function to the local OpenCL/Native runtime execution system to execute the kernel with its buffer indicator set to Read/Write. The client system 120 executes the kernel and writes its output to the corresponding output buffer 122 as the function call is now compliant with IO buffer rules. If the agent 121 is required to immediately push back the buffer 122 to the host, it first checks the buffer IO runtime violation flag. If this set, the buffer 122 is not written back right away but is kept in memory for a second kernel to use the output buffer in a different invocation.

In one embodiment, the agent 121 of the client system 120 is an OpenCL accelerator runtime environment that an acts as a proxy for the host 110 and calls OpenCL API on behalf of the host 110. The OpenCL accelerator runtime environment responds to host commands and sends event notifications back to the host.

In one embodiment, the data management and dispatch unit 111 determines which data will be read back from the buffer 122 of the client system 120 to the host 110 after kernel execution. The data management and dispatch unit 111 may instruct the agent 121 of the client system 120 to push these data from the buffer 122 to the host 110 after kernel execution. By selectively pushing the data from the client system 120 to the host 110 and storing the data in the host buffer 113, the data management and dispatch unit 111 increases execution speed and minimizes latency by providing the host 110 with access to the data in the host buffer 113 without waiting for the host 110 to request the data from the client system 120.

As discussed above, in certain instances, the data written by a kernel on the client system 120 may not need to be read by the host 110. For example, these data may only be needed for execution of another kernel on the client system 120. If the data management and dispatch unit 111 determines that the data in the buffer 122 of the client system 120 are not need by the host 110, the data in the buffer 122 is not sent back to the host 110 after kernel execution.

Accordingly, embodiments of the present disclosure encompass a host computer 110 is configured to transmit a predetermined class of instructions, such as OpenCL instructions and instructions including an "enqueue native kernel" function, to a client system for execution. The client system executes the function and pushes the results back to the host computer. The client system may also hold results from a kernel and combine the results with those of a subsequent kernel, or use the results as inputs for a subsequent kernel, prior to pushing the results to the host computer 110.

Figure 2:
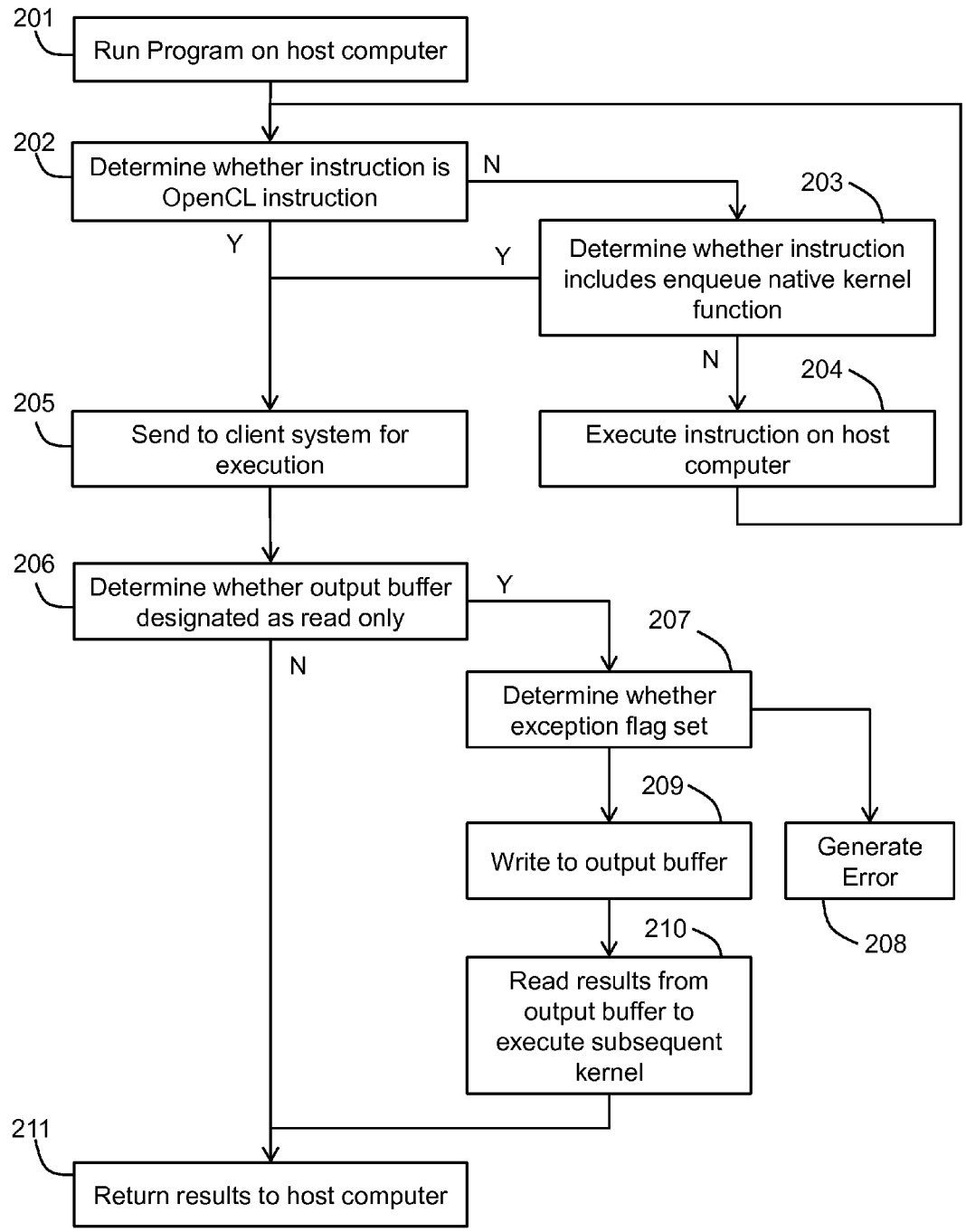
FIG. 2 is a flowchart illustrating a method operation of a hybrid system according to an embodiment of the present disclosure.

FIG. 2 illustrates a method of executing instructions according to an embodiment of the invention. In block 201 a program is run on a host computer. In block 202, the host computer determines whether an instruction being run is an OpenCL instruction. If yes, then the instruction is sent to a client system for execution in block 205. In particular, the host computer generates a buffer including kernel of the function called by the instruction, input parameters of the function and any required descriptor data.

If the instruction is not an OpenCL "enqueue task" or "enqueue ND Range kernel" instruction, then the host computer determines in block 203 whether the instruction includes an "enqueue native kernel" function. If so, then the instruction, or the function called by the instruction, is sent to the client system for execution in block 205. Examples of functions which may include the enqueue native kernel function include floating point functions and other scientific functions, particularly complex functions requiring parallel processing of equations.

If the instruction does not include the enqueue native kernel function, then the instruction is executed by the host computer in block 204 and the next instruction is fetched and analyzed.

In block 206, when the kernel sent to the client system has been executed, an agent in the client system that controls interaction of the host computer with the client system determines whether the output buffer corresponding to the kernel is designated as "read-only." If not, then the results from the executed kernel are pushed to the host computer in block 211.

If the output buffer is designated as read-only, then the agent of the client computer determines whether an exception flag is set in the descriptor of the buffer. If it is determined that the exception flag is not set, then an error is generated in block 208, since data cannot be written to the buffer. However, in embodiments of the invention the host system, or a programmer generating the program executed by the host computer, includes in the instruction an exception indicator to permit the results from the executed kernel to be written to the read-only buffer in block 209.

In block 210, the results from the output buffer are read and either used as input parameters for a next kernel executed by the client system or are combined with the results of the next kernel. The results of the subsequent kernel may be stored in a buffer and pushed to the host computer in block 211.

Figure 3:
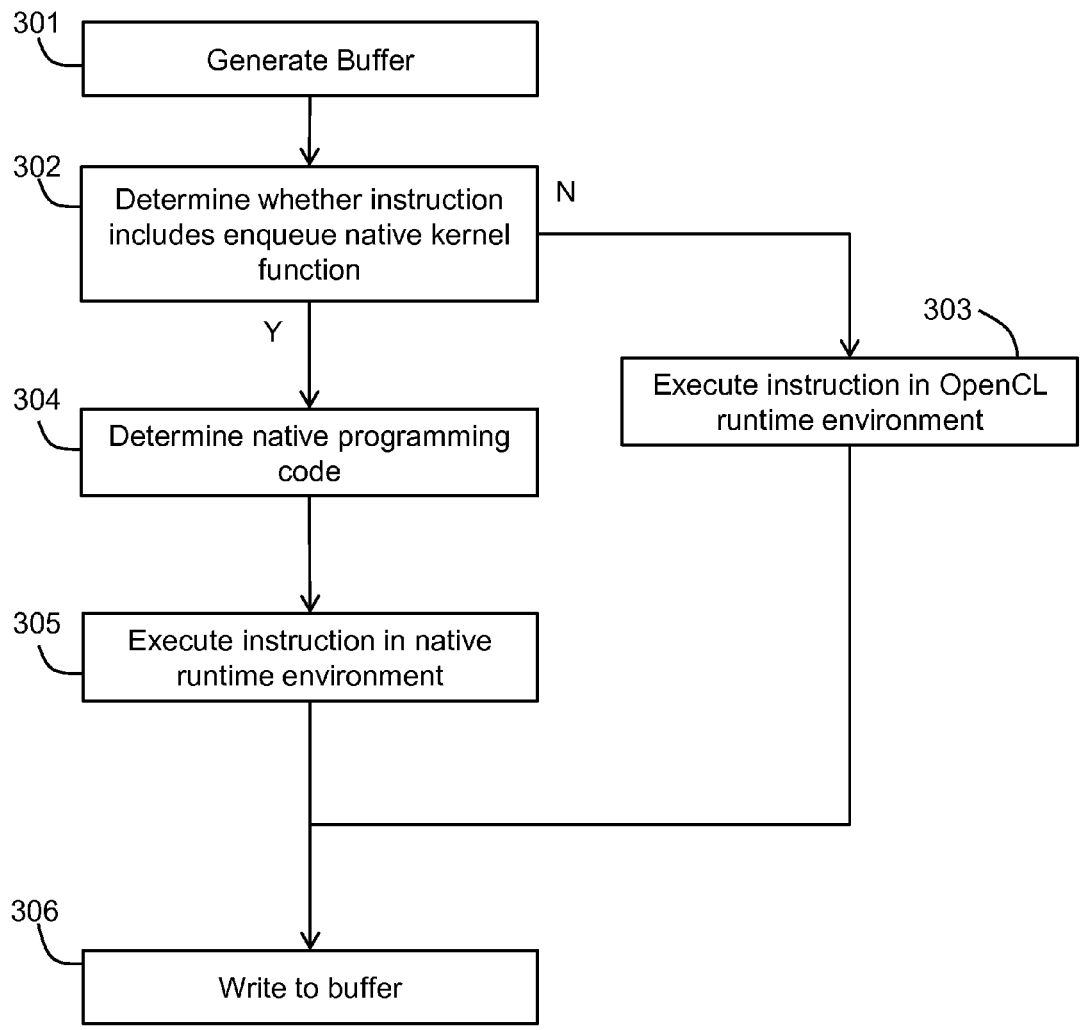
FIG. 3 is a flowchart illustrating a method of executing kernels in a client system according to an embodiment of the present disclosure.

FIG. 3 illustrates an operation of the agent of the client system in additional detail. In particular, in block 301, the client system generates a buffer or set of buffers including a kernel. In block 302, the agent determines whether an instruction in the buffer, such as a descriptor or data in the kernel itself, includes an "enqueue native kernel" function. If not, then in block 303, the kernel is executed in an OpenCL runtime environment, which may be the default runtime environment of the client system.

If it is determined in block 302 that the instruction includes the "enqueue native kernel" function, then the agent of the client system determines the native programming code of the kernel. For example, in one embodiment the client system is configured to receive OpenCL instructions from a host computer, but the kernel is written in C or FORTRAN programming code. Accordingly, in block 305, the agent directs the client system to execute the kernel in the native programming code, and the client system executes the kernel in the native runtime environment. In block 306, the results of the executed kernel are written to the buffer.

Accordingly, the disclosed methods for distributed function execution across a hybrid system allow for the hybrid system to execute a first class of instructions on a host computer and a second class of instructions on a client system. The methods also allow for the hybrid system to recognize particular functions, in addition to the second class of instructions, to be sent to the client system for execution. The client system according to embodiments of the invention communicates with the host computer to receive the second class of instructions and the additional functions and to execute the additional functions in their native programming code.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for executing kernels in a hybrid system, the method comprising:
    running a program on a host computer;
    identifying in an instruction stream of the program a first instruction including a function of a target classification;
    generating a first kernel including the function;
    based on identifying the first instruction as being of the target classification, transmitting the first kernel to a client system to execute the first kernel;
    determining whether to store results of executing the first kernel in a read-only buffer of the client system based on determining whether a subsequent instruction of the target classification relies upon results of the first instruction.

2. The computer implemented method of claim 1, wherein the client system operates an Open Computing Language (OpenCL) runtime environment, and
    the host computer generates the first kernel based on identifying the function as an OpenCL function.

3. The computer implemented method of claim 1, wherein the client system operates an Open Computing Language (OpenCL) runtime environment,
    the host computer is configured to transmit non-OpenCL instructions to the client system based on identifying the function as being associated with an instruction to enqueue the first instruction in a native kernel, and
    the host computer generates the first kernel based on identifying the function as being associated with the instruction to enqueue the first instruction in the native kernel.

4. The computer implemented method of claim 3, wherein the client system is configured to execute the first kernel in a non-OpenCL native runtime environment based on detecting the instruction to enqueue the first instruction in the native kernel.

5. The computer implemented method of claim 1, wherein the host computer generates the first kernel based on identifying the function as one of a floating point instruction and a scientific function supporting the simultaneous execution of equations.

6. The computer implemented method of claim 1, further comprising:
    identifying, by the client system, an exception indicator associated with the first kernel to permit the client system to write the results of executing the first kernel to the read-only buffer.

7. The computer implemented method of claim 1, further comprising:
    executing, by the client system, the first kernel; and
    pushing the results of executing the first kernel to a buffer of the host computer.

8. The computer implemented method of claim 1, further comprising:
    determining, by the client system, that the results of the first kernel are stored in a read-only buffer;
    reading the results of the first kernel from the read-only buffer to execute a second kernel on the client system, based on determining that the results of the first kernel are stored in the read-only buffer; and
    pushing one of the results of the second kernel and combined results of the first and second kernels from the client system to the host computer.

9. A non-transitory computer program product for executing a kernel in a hybrid system, the computer program product comprising:
    a non-transitory storage medium readable by a processing circuit of one or more of a host computer and a client system, and storing instructions for execution by the processing circuit for performing a method comprising:
    running a program on the host computer;
    identifying in an instruction stream of the program, a first instruction including a function of a target classification;
    generating a first kernel including the function based on identifying the function as having the target classification;
    transmitting the first kernel to the client system to execute the first kernel; and
    determining whether to push a read-only buffer to the client system to store results of executing the first kernel based on determining whether a subsequent instruction of the target classification relies upon results of the first instruction.

10. The computer program product of claim 9, wherein the client system operates an Open Computing Language (OpenCL) runtime environment, and
    the host computer generates the first kernel based on identifying the function as an OpenCL function.

11. The computer program product of claim 8, wherein the client system operates an Open Computing Language (OpenCL) runtime environment, the host computer generates the first kernel based on identifying the function as a target type of non-OpenCL function, and the non-OpenCL function is a C programming language function.

12. The computer program product of claim 9, wherein the host computer generates the first kernel based on identifying the function as one of a floating point instruction and a scientific function supporting the simultaneous execution of equations.

13. The computer program product of claim 9, wherein the method includes identifying, by the client system, an exception indicator associated with the first kernel to permit the client system to write the results of executing the first kernel to the read-only buffer.

14. The computer program product of claim 9, wherein the method further comprises:

executing, by the client system, the first kernel; and pushing the results of executing the first kernel to a buffer of the host computer.

15. The computer program product of claim 9, wherein the method further comprises:

determining, by the client system, that the results of the first kernel are stored in a read-only buffer;

reading the results of the first kernel from the read-only buffer to execute a second kernel on the client system, based on determining that the results of the first kernel are stored in the read-only buffer; and pushing combined results of the first and second kernels from the client system to the host computer.

16. A client computer system for executing a function kernel, the client computer system comprising:

memory having stored therein a computer program; and a processor configured to receive from a host computer a set of buffers having stored in at least one of the buffers of the set of buffers a kernel corresponding to an instruction of programming code, to execute the kernel, to store results of executing the kernel in an output results buffer, and to determine whether to transmit the results of executing the kernel to the host computer based on determining whether the output results buffer is a read-only buffer.

17. The client computer system of claim 16, wherein the processor is configured to execute programming code in an Open Computing Language (OpenCL) runtime environment, and the processor is further configured to detect an enqueue native kernel instruction associated with the kernel and execute the kernel in a non-OpenCL native runtime environment based on detecting the enqueue native kernel instruction.

18. The client computer system of claim 16, wherein the processor is configured to identify an exception indicator associated with the first kernel to permit the processor to write the results of executing the first kernel to the read-only output results buffer.

19. The client computer system of claim 16, wherein the processor is configured to push the results of executing the first kernel to a buffer of the host computer.

20. The client computer system of claim 16, wherein the processor is configured to determine that the results of the first kernel are stored in a read-only output results buffer, to read the results of the first kernel from the read-only output results buffer to execute a second kernel based on determining that the results of the first kernel are stored in the read-only output results buffer, and to push one of results of the second kernel and combined results of the first and second kernels from the client system to the host computer.

* * * * *